ALL BAND TELEVISION ANTENNA

Original Filed March 10, 1953 3 Sheets-Sheet 1

PRIOR ART ANTENNAS

INVENTOR
Lewis H. Finneburgh Jr.
BY Evans + McCoy
ATTORNEYS

ALL BAND TELEVISION ANTENNA

Original Filed March 10, 1953 3 Sheets-Sheet 2

INVENTOR
Lewis H. Finneburgh Jr.
BY Evans & McCoy
ATTORNEYS

ALL BAND TELEVISION ANTENNA

Original Filed March 10, 1953 3 Sheets-Sheet 3

INVENTOR
Lewis H. Finneburgh Jr.

BY Evans & McCoy
ATTORNEYS

United States Patent Office

Re. 23,943
Reissued Feb. 8, 1955

23,943

ALL BAND TELEVISION ANTENNA

Lewis H. Finneburgh, Jr., Cleveland Heights, Ohio, assignor to Morris L. Finneburgh Original No. 2,655,599, dated October 13, 1953, Serial No. 341,580, March 10, 1953. Application for reissue December 1, 1954, Serial No. 472,547

30 Claims. (Cl. 250—33)

Matter enclosed in heavy brackets [ ] appears in the original patent but forms no part of this reissue specification; matter printed in italics indicates the additions made by reissue.

This invention relates to antennas for radio and television broadcasting and reception, and particularly to antennas of the collinear type in which a series of longitudinally spaced conductors are connected for substantially in-phase operation.

With all antennas of which I am aware, maximum response is obtained over a limited and generally a relatively narrow portion of the range of frequencies useful for radio and television broadcasting. For many purposes, this is not objectionable; in fact, it is frequently an advantage. However, in the case of antennas for television reception, for instance, it is generally desirable that the greatest possible response be obtained over the entire range of frequencies employed for television broadcasting. Though this may not be important in some localities where broadcasts receivable from stations within a reasonable distance from the antenna are confined to closely adjacent frequency bands, it is still important to the antenna manufacturer desiring to produce one standard antenna that is satisfactory for all or most geographical areas.

Another problem for the television antenna manufacturer, and one which is of concern to a large proportion of the ultimate customers, is to produce an antenna having high directivity. This is necessary in order to minimize interference with broadcasts from a station toward which the receiving antenna is directed by broadcasts from other nearby stations operating on the same or closely adjacent wave bands, but located in different directions from the receiving antenna.

Still another problem is to produce an antenna having as much gain as possible in order to bring in broadcasts emanating from relatively distant points. This is particularly important to television reception in the rural or "fringe" areas that are relatively remote from the stations whose broadcasts are to be received.

All three of these problems have been and continue to be important where the receivable broadcasts are confined to the so-called "very high frequency" (V. H. F.) ranges. With the advent of broadcasting over the so-called "ultra high frequency" (U. H. F.) bands as well, the magnitude and acuteness of these problems has grown apace. In a constantly increasing number of localities, obtaining high gain and directivity over very wide ranges of frequencies is an essential requirement for satisfactory television reception.

Much work has been done in an effort to solve all of these problems as the television industry has grown, and much has been accomplished. However, up to the present time, no single antenna of which I am aware has proven satisfactory for television reception over the entire V. H. F. range and also over any substantial part of the U. H. F. range. For example, in my U. S. Patents No. 2,566,287, granted August 28, 1951, for Television Antenna System and No. 2,630,531, granted March 3, 1953, for Television Antennas, I disclosed an antenna of the collinear type that admirably solves all three of the foregoing problems over all the bands of frequencies utilized by channels 2 to 13 inclusive of the present V. H. F. range. The same antenna, made on a reduced scale, is equally well adapted for operation in the U. H. F. range, whether in the form of the 2-bay collinear antenna illustrated in the aforementioned patents or in the more common commercial form of a vertically stacked pair of identical 2-bay units. However, this antenna has limited utility for U. H. F. when designed for V. H. F. and vice versa.

Nevertheless, the collinear type of antenna has outstanding gain and directivity characteristics which it would be highly desirable to achieve in a single unit having a sufficiently broad-band response to be used effectively over both the V. H. F. and U. H. F. frequency ranges.

Accordingly, the principal object of the present invention is to provide a collinear type of antenna having high gain characteristics in both the V. H. F. and U. H. F. frequency ranges.

More specifically, it is an object of the invention to provide a collinear type of antenna which will operate with high gain over as much as possible of the frequency ranges of both the V. H. F. and U. H. F. broadcasting channels.

Still another object of the invention is to accomplish the foregoing while retaining, to the greatest extent possible, the high degree of directivity that is characteristic of known collinear antennas.

By means of the present invention, these objectives have been accomplished with unusual success; and the principles employed may be utilized with appropriate variations in physical dimensions and electrical values to obtain comparable results in other and additional frequency ranges.

The invention is characterized in part by the utilization of a plurality of separated, collinear, conductors of substantially equal resonant lengths. Three such elements in a single collinear array, dimensioned for maximum response as half-wave radiating elements in a selected intermediate frequency range, are generally preferred, though four or more collinear conductors may be employed. The collinear array is preferably driven through a two conductor transmission line connected to feed points adjacent the geometrical center of the array, though other driving systems may be used in accordance with well-known principles. By bridging the discontinuities or gaps between adjacent ends of the separated collinear elements in such an array with circuits that are anti-resonant at the fundamental frequency of the individual collinear elements, substantially in-phase operation is obtained with consequent high gain at that fundamental frequency, and over a limited range above and below the fundamental frequency. Also, the plurality of collinear elements, so connected, operate as a unit in the manner of a single half-wave dipole at about ⅓ the fundamental frequency of the individual collinear elements (depending on the impedance at the lower frequency of the circuits that bridge the gaps between adjacent collinear elements), and over a limited frequency range above and below that value. By proportioning the separated collinear elements to have a fundamental frequency in about the center of the high portion of the V. H. F. range (174 to 216 megacycles), such an array also acts as a half-wave dipole in a lower range which, by proper design, may be the lower portion of the V. H. F. range (54 to 88 megacycles). This relationship has been employed, in conjunction with certain additional features, in the antenna disclosed and claimed in my above-mentioned patents.

The present invention also causes such an array to act as a three element collinear antenna in a third range of higher frequencies, such as the U. H. F. range (470 to 890 megacycles), by modifying the centermost collinear element or elements of the array. This is done by providing a pair of gaps in the centermost element or elements and by bridging each of these gaps with a circuit that is anti-resonant at, say, three times the fundamental frequency of the individual collinear elements. Thus the centermost element or elements may comprise a plurality of separated collinear sections that are individually resonant as half-wave elements at frequencies in the U. H. F. range and that are connected together by anti-resonant circuits selected to produce substantially in-phase operation of these three sections at their fundamental U. H. F. frequency.

In U. S. Patent No. 2,282,292 to Amy and Aceves, a pair of anti-resonant circuits are interposed in a half-wave dipole for the purpose of creating an infinitely high impedance at certain selected frequencies. However, the location of these anti-resonant circuits along the length of the dipole is such that the portions of the antenna disposed outwardly in opposite directions beyond the anti-resonant circuits are not resonant at these selected frequencies. As a result, the anti-resonant circuits either act as metallic insulators to substantially cut off or isolate the outer portions of the antenna at the frequencies at which their impedance is infinite, or they act substantially as ordinary conductors of relatively low impedance at other frequencies, and never function as phase reversing circuits to produce in-phase operation of the separated sections of the antenna as half-wave collinear elements.

In accordance with the present invention, one pair of anti-resonant circuits functions in a low frequency range as low impedance conductors, in the manner suggested by Amy and Aceves, but in an intermediate frequency range they function as phase reversing circuits, rather than as insulators; and the other pair of anti-resonant circuits function in the low and intermediate frequency ranges as low impedance conductors, but in a still higher frequency range they also function as phase reversing circuits. Depending upon whether or not a particular frequency of operation in the highest frequency range closely approaches a harmonic of the fundamental frequency in the intermediate frequency range, the outer portions of the antenna may or may not be substantially cut-off at such frequency of operation. However, possibly because of the distance of those outer portions of the antenna from the preferred central feed point, their effects on the operation of the antenna in the highest frequency range are generally relatively small. They tend to produce undesirable minor lobes in the directivity pattern of the antenna at certain points in the highest frequency range, but, at the same time, they seem to enhance the broadband characteristics of the antenna in that frequency range.

Other objects, advantages, and characteristics of the present invention will become apparent from the following explanation of the principles utilized in the invention and the detailed description of several illustrative embodiments of the invention, considered in conjunction with the accompanying drawings.

In the drawings, to assist in explaining the theory and mode of operation of the invention, certain prior art antennas are shown in Figs. 1 and 2, and the several embodiments of the present invention are shown in Figs. 3 to 14.

Figure 5:
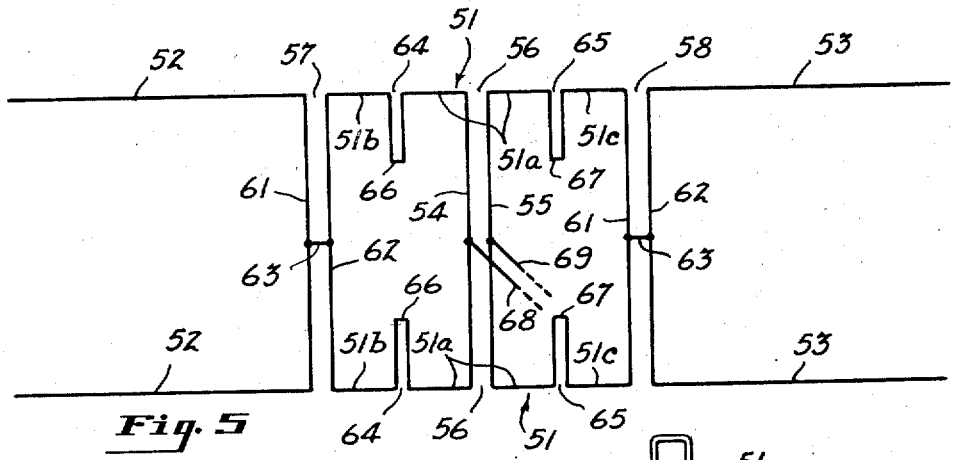
Figure 6:
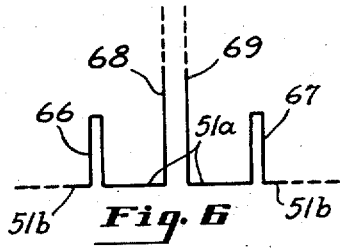
Figure 7:
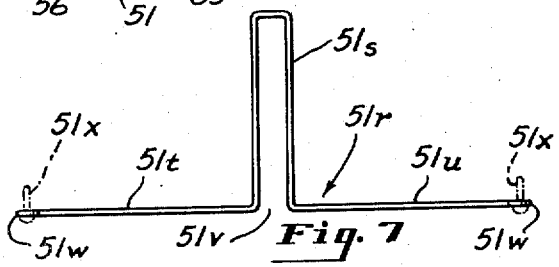
Figure 8:
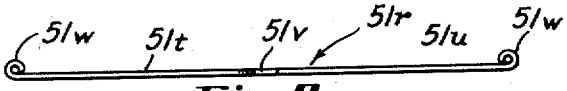
Figure 9:
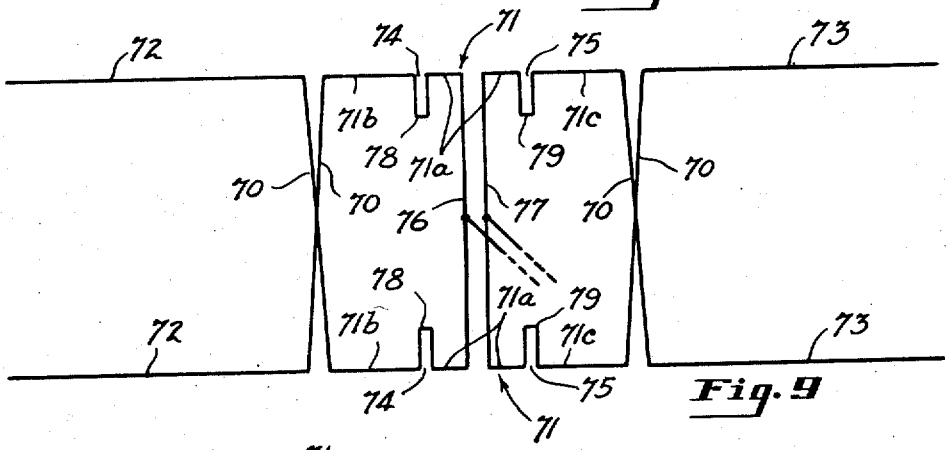
Figure 10:
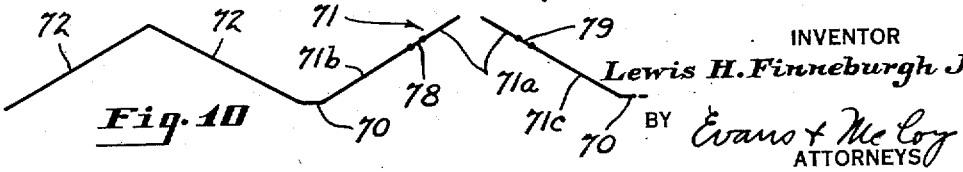

Fig. 5 is a diagrammatic illustration in elevation showing the application of the invention to an antenna comprising two vertically spaced arrays, each containing three main collinear elements spaced apart and bridged by main phase reversing stubs with the main stubs of the upper array disposed in back-to-back relationship with the main stubs of the lower array and with additional stubs applied to the central collinear element of each array to render the antenna responsive in an additional higher frequency range;

Fig. 6 is a fragmentary plan view of an antenna similar to the one in Fig. 5, but with the additional stubs incorporated in the central collinear element of each array extending in a horizontal plane rather than in a vertical plane to facilitate collapsing of the antenna for packaging;

Fig. 7 is a plan view of a unitary conductor suitable for substitution in the antenna of my Patents Nos. 2,566,287 and 2,630,531 in place of the portion of the central collinear element in each array extending laterally to either side of the center feed gap, four such unitary conductors being required to convert the antenna of my said patents to one conforming to the antenna of Fig. 5 in accordance with the present invention;

Fig. 8 is an elevation of the antenna conductor of Fig. 7 as viewed from the front of the antenna in which it is intended to be installed;

Fig. 9 is a diagrammatic illustration in elevation showing the application of the invention to a modified form of the antenna of Fig. 5;

Fig. 10 is a fragmentary plan view showing an optional angular relationship in a horizontal plane of the generally collinear radiating elements of the antenna of Fig. 9.

Figure 11:
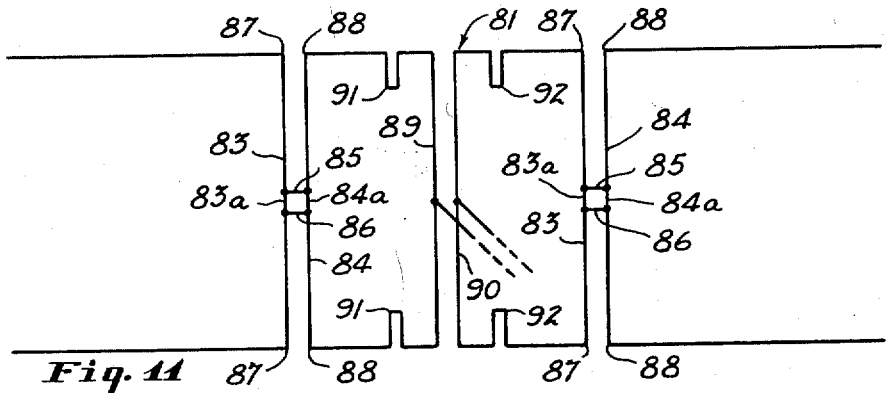
Figure 12:
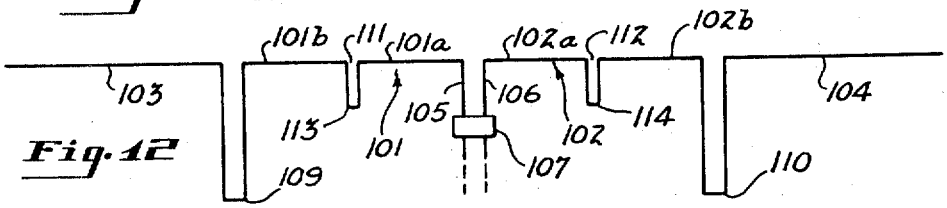
Figure 13:
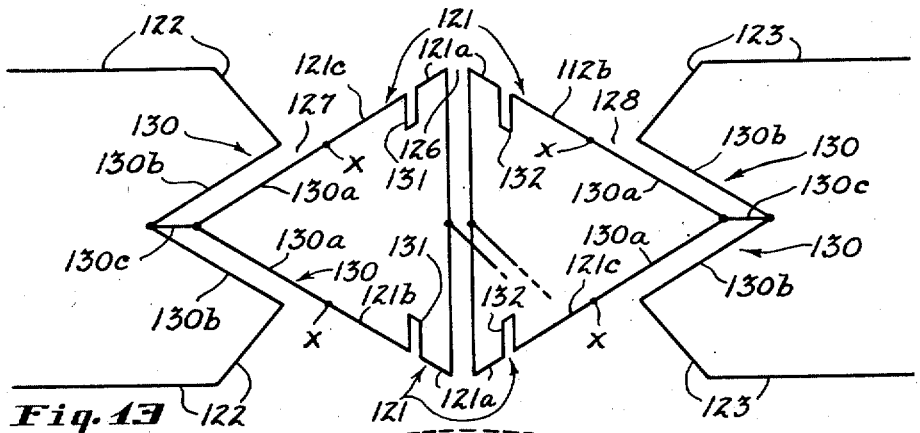
Figure 14:
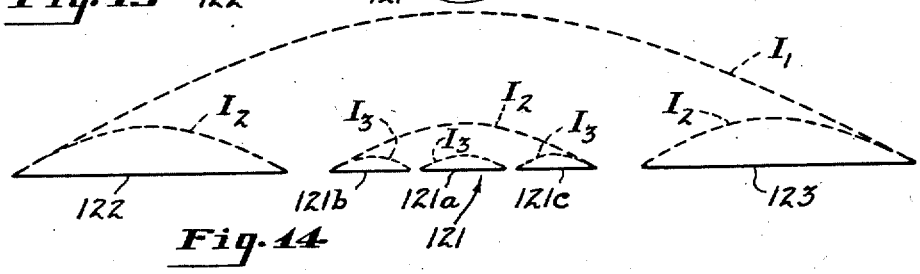

Fig. 11 is a fragmentary diagrammatic illustration in elevation showing the application of the invention to still another modified form of the antenna of Fig. 5;

Fig. 12 is a diagrammatic illustration of a four-element collinear antenna modified in accordance with the present invention by the insertion of an anti-resonant circuit in each of the centermost collinear elements;

Fig. 13 is a diagrammatic illustration in elevation showing the application of the invention to still another modified form of the antenna of Fig. 5; and Fig. 14 is an electrical current diagram showing the current relationships in the antenna of Fig. 13 when operating at each of its three optimum frequencies.

Figure 1:
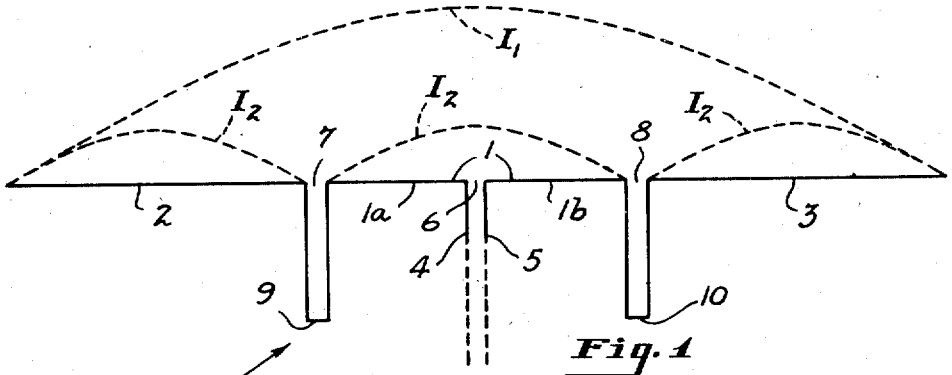
Fig. 1 is a diagrammatic illustration of a conventional, three-element, collinear antenna in which adjacent pairs of collinear elements are connected together by anti-resonant circuits in the form of so-called quarter-wave, shorted or phase reversing stubs.

Referring to Fig. 1 of the drawings, the antenna diagrammatically illustrated therein comprises three collinear elements 1, 2, and 3 of suitable conductor material, the central element 1 being connected adjacent its mid-point to the leads 4 and 5 of a two conductor transmission line. In the form shown, the central element 1 has a gap 6 at its mid-point which preferably is quite small compared to the length of the elements, and the transmission line leads 4 and 5 are connected at opposite ends of this gap to the two parts 1a and 1b of the central element 1. However, it will be understood by those skilled in the art that the employment of a gap 6 is not essential and that the central element 1 may be a continuous conductor, in which case the leads 4 and 5 are connected in substantially the same centrally spaced location, possibly through an impedance matching device.

The collinear elements 1, 2, and 3 are normally and ideally of the same resonant length, which is ½ the fundamental wave length for which the antenna is designed. As shown, the collinear elements are separated by gaps 7 and 8 that are also preferably quite small compared to the resonant length of the collinear elements themselves. Bridging the gaps 7 and 8 are quarter-wave shorted stubs 9 and 10 which are preferably designed, in accordance with well-known principles, to have a developed length roughly equal to the length of the individual collinear elements and maximums (substantially infinite) impedance at the fundamental resonant frequency of the individual collinear elements. When so dimensioned, the stubs may be most aptly characterized as anti-resonant circuits at that fundamental frequency. When a plurality of generally collinear elements connected by such circuits are of substantially the same resonant length, currents of the fundamental resonant frequency in the collinear elements are in-phase and may be represented by the fragmentary sine wave curves $I_2$ in Fig. 1. Thus, the stubs 9 and 10 cause the resonant currents in all three collinear elements 1, 2, and 3 to be in-phase, thereby greatly increasing the gain of the antenna compared to a half-wave dipole tuned to the same frequency.

When the antenna of Fig. 1 has a current of approximately ⅓ its fundamental frequency (three times the fundamental wave length), imposed upon it, the stubs 9 and 10 are no longer anti-resonant and act merely as conductors having a relatively low impedance. This causes the antenna to function as a half-wave dipole at the lower frequency, and the current in the antenna may be approximately represented by the curve $I_1$. (Note: current representations in the drawing are not intended to represent the relative magnitudes of the currents.) In practice, the curve $I_1$ will not conform exactly to a sine wave, but will be distorted at the stub locations to a degree depending upon the impedance of the stubs at the frequency of the current $I_1$.

While this analysis necessarily assumes many ideal conditions that are never quite achieved in practice, small deviations from ideal dimensional and electrical values cause only correspondingly small deviations in the actual performance of a physical antenna. Similarly, though the description of the performance characteristics could be precisely accurate only for a single resonant frequency for each of the two modes of operation described, approximations of such characteristics are achieved in practice in spite of a moderate deviation either way from the optimum frequency. As a result the antenna of Fig. 1 will operate essentially as described over a moderate frequency range embracing the optimum frequency of the current $I_1$, and over a comparable frequency range embracing the optimum frequency of the current $I_2$.

Figure 2:
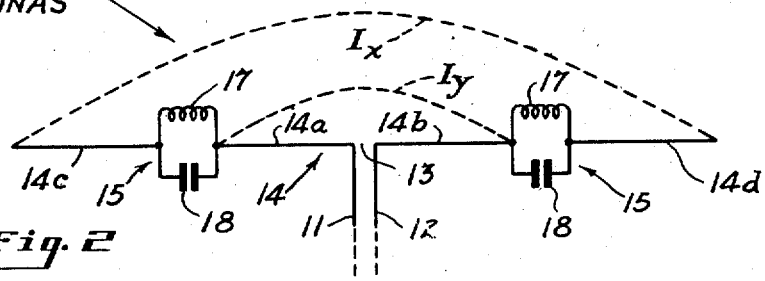
Fig. 2 is a diagrammatic illustration of a conventional half-wave dipole antenna that has been modified by interposing anti-resonant circuits in the two arms of the dipole, each of the anti-resonant circuits, in this case, being in the form of a loop having an inductor and a capacitor in parallel, as disclosed in the above-mentioned Patent No. 2,282,292 to Amy and Aceves.

Referring next to Fig. 2, there is diagrammatically shown a half-wave dipole antenna which is driven adjacent its mid-point by a two conductor transmission line, having leads 11 and 12 connected on opposite sides of a central gap 13, the same as in Fig. 1. In this case, the antenna from tip to tip may be viewed as a single half-wave conductor 14, its length being selected so that it is resonant as a half-wave conductor to a particular, relatively low frequency. A current of this frequency imposed upon the antenna is approximately represented by the curve $I_x$ (again ignoring deviations from a true sine wave due to the relatively low impedance of circuits 15 hereafter described).

Interposed in the conductor 14 on opposite sides of the leads 11 and 12 are a pair of anti-resonant circuits 15, each of which consists of a loop which may include an inductor 17 and a capacitor 18. The gaps in which the anti-resonant circuits 15 are interposed are exaggerated in length in the drawing and are preferably quite small compared to the length of the antenna or any of its separated portions. In the following discussion, the lengths of these gaps are assumed to be negligible and are ignored for simplification.

As shown, the anti-resonant circuits 15 are interposed so that the effective conductor length between them, comprising identical portions 14a and 14b and the center gap 13, are about twice the length of each of the identical, individual, extreme conductor portions designated 14c and 14d. So long as the length of each outer portion 14c and 14d is substantially different (longer or shorter) than the combined length of the inner portions 14a and 14b, the mode of operation is essentially the same (except for certain harmonic conditions mentioned below). The values of inductance and capacitance for the circuits 15 are selected according to known principles so that both circuits are anti-resonant (i. e. have substantially infinite impedance) at the frequency for which the conductor between them (comprising the portions **14*a* and 14*b***) is resonant.

If the fundamental resonant length of the central conductor portions 14a plus 14b (e. g. 2.5 meters) is substantially different from the individual resonant lengths of the extreme conductor portions 14c and 14d (e. g. 1.25 meters), the circuits 15 function as insulators at the frequency at which the central conductor portions 14a plus 14b are resonant, thus cutting off the extreme conductor portions 14c and 14d. At substantially different frequencies, however, the impedance of the anti-resonant circuits 15 is relatively low, and they function as conductors of relatively low impedance, giving the antenna an effective resonant length roughly corresponding to its over-all physical length. Thus, the antenna functions as a half-wave dipole at the frequency corresponding to its over-all resonant length, the current therein being represented by the sine wave curve $I_x$; and at a higher frequency corresponding to the resonant length of the central portions 14a plus 14b, the antenna functions as a shorter half-wave dipole, the extreme conductor portions 14c and 14d being inoperative and the current in the central portion being represented by the sine wave curve $I_y$.

Exceptions to the above-described mode of operation of the antenna of Fig. 2 occur only if the fundamental resonant length of the outer conductor portions 14c and 14d is a whole multiple of the fundamental resonant length of the inner portion 14a plus 14b (i. e. the fundamental resonant frequency of 14c and 14d is 1, or ½, or ⅓, etc. of the fundamental resonant frequency of 14a plus 14b). When designed to have any such proportional relationship of its parts, the outer portions 14c and 14d will not be cut-off, and many different harmonic response conditions are obtained. For example, when 14c and 14d are both of the same resonant length as 14a plus 14b, the antenna of Fig. 1 is obtained.

A number of variations of the antenna of Fig. 2 are disclosed in the above-mentioned patent of Amy and Aceves. In all of those variations, however, whatever the frequency of operation, the antenna functions only as a dipole of variable length. The function of the anti-resonant circuits employed is merely that of "dividers" for automatically adjusting the length of the dipole according to the frequency of the imposed wave. The same would be true if stubs, such as 9 in Fig. 1, of appropriate physical dimensions, were to be substituted for the inductor-capacitor loops 15 in the antenna of Fig. 2.

Only in the event that the conductor portions 14c and 14d are each of substantially the same resonant length as the combined central conductor portions 14a plus 14b, could the anti-resonant circuits in the antenna of Fig. 2 produce in-phase collinear operation of the separated aligned conductors as half-wave elements. In this case, the inductor-capacitor loops 15 would be tuned to the same frequency to which each of the three antenna portions separated thereby is resonant (i. e., 14a plus 14b, and 14c, and 14d) and would function substantially as phase reversing stubs, causing the entire antenna to operate as a three-element collinear antenna of the character shown in Fig. 1.

From the foregoing discussion of the basic differences and superficial similarities of the antennas of Figs. 1 and 2, it will be recognized that, in the dipole antenna of Fig. 2, the anti-resonant circuits are utilized only to cut off the outer portions **14*c* and 14*d* of the antenna when it is operating at the resonant frequency of the inner portion 14a plus 14b. By contrast, when the same or equivalent anti-resonant circuits are employed to connect adjacent conductors of substantially equal resonant length in the collinear antenna of Fig. 1, the anti-resonant circuits, instead of cutting off the outer portions 2 and 3 of the antenna at the resonant frequency of the central element 1**, actually couple the outer elements with the inner element for in-phase operation as three half-wave collinear conductors. In both antennas (ignoring the harmonic relationships described above), the anti-resonant circuits operate essentially as ordinary conductors at frequencies substantially above or below the fundamental frequency to which they are tuned, with a relatively low, variable impedance that is either inductive or capacitive in character depending on the particular frequency of operation.

Figure 3:
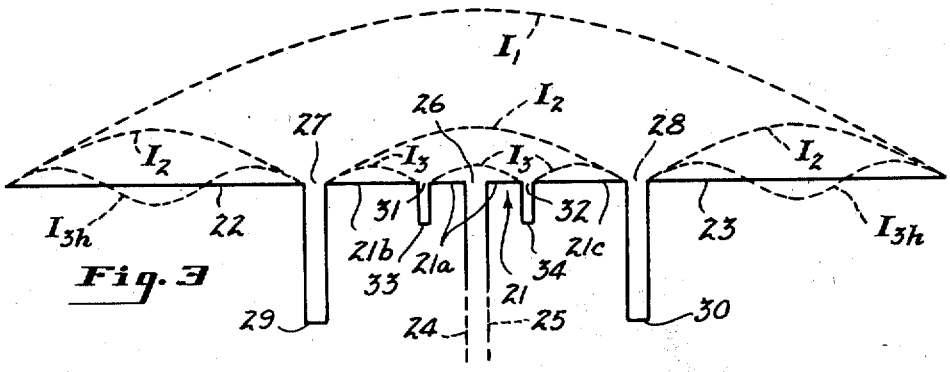
Fig. 3 is a diagrammatic illustration of a three-element collinear antenna similar to the one shown in Fig. 1, but modified in accordance with the present invention by the insertion of an additional pair of anti-resonant circuits in the central element of the three-element collinear array.

Referring now to Fig. 3, the present invention may be applied to a conventional, three-element, collinear antenna of the type shown in Fig. 1 by modifying the central element, generally designated 21, of the collinear array. The three collinear elements 21, 22, and 23 are of substantially the same resonant length, and the central element 21 is driven adjacent its mid-point by a two conductor transmission line having leads 24 and 25 connected on opposite sides of a center feed gap 26. Gaps 27 and 28 separating the three collinear elements 21, 22, and 23, are bridged by quarter-wave shorted stubs 29 and 30.

In accordance with the invention, the central element 21 is provided with an additional pair of gaps 31 and 32 that may be located to divide the central element 21 into three collinear subelements 21a, 21b, and 21c, also of substantially equal resonant lengths. Additional stubs 33 and 34 bridge the gaps 31 and 32, respectively, and may be dimensioned to be anti-resonant at substantially the resonant frequency of the individual sub-elements 21a, 21b, and 21c.

The presence of the additional gaps 31 and 32 and stubs 33 and 34 causes the resonant length of the entire central element 21 to be somewhat greater than that of a straight conductor of the same tip-to-tip length. In all of the antennas illustrated, the central feed gap also has a similar, small effect on the resonant length. Accordingly, if accurate matching of resonant lengths is desired, it may be necessary to take this into account and make appropriate minor adjustments in the physical lengths of the various conductors.

In the light of the description of the mode of operation of the antenna of Fig. 1, it will be apparent that the small stubs 33 and 34 in Fig. 3 will have substantially infinite impedance at the fundamental frequency of each subcollinear element 21a, 21b, and 21c. At the much lower fundamental frequency of the collinear elements 21, 22, and 23, and at the still lower fundamental frequency of a half-wave dipole comprising all three of the main collinear units, however, the impedance of the small stubs 33 and 34 will be very low. Similarly, the large stubs 29 and 30 will have substantially infinite impedance at the fundamental frequency of the main collinear elements 21, 22, and 23, but relatively low impedance at most other frequencies.

Since the subcollinear elements 21a, 21b, and 21c are of substantially the same resonant length, it will also be understood that, at their high resonant frequency, the small stubs 33 and 34 function not as mere insulators, but as phase reversing circuits causing in-phase operation of the subcollinear elements as a high frequency collinear antenna. Under these conditions, the currents in the subcollinear elements are represented by the sine wave curves $I_3$. At the intermediate resonant frequency of the main collinear elements 21, 22, and 23, however, the small stubs 33 and 34 function as conductors of relatively low impedance and the main stubs 29 and 30 as phase reversing circuits causing in-phase operation of the main collinear elements as an intermediate frequency collinear antenna. In this case, the currents in the antenna are represented by the sine wave curves $I_2$. Finally, at the low resonant frequency of a half-wave dipole comprising the elements 21, 22, and 23, all of the stubs function as conductors of relatively low impedance, and the antenna as a whole functions as a half-wave dipole, the current in the antenna then being represented by the sine wave curve $I_1$.

It is particularly to be noted that, if the impedances and resonant lengths of the various conductors are properly matched so that the frequency of $I_3$ is substantially three times the frequency of $I_2$ (a harmonic relationship), the impedance of the main stubs 29 and 30 will again become substantially infinite and these stubs will become ¾ wave phase reversing stubs with currents in the collinear elements approximately represented by the curves $I_{3b}$. Thus, even at the high fundamental resonant frequency of sub-elements 21a, 21b, and 21c, the outer elements 22 and 23 are not cut off and may contribute somewhat to the gain at this frequency. At frequencies above and below the fundamental frequency of the sub-elements 21a, 21b, and 21c (but still of the same order of magnitude), many different current relationships exist. In this case, the presence of the main stubs 29 and 30 and the outer elements 22 and 23 seems to have a broad-banding effect on the antenna in the general range of the frequencies of the current $I_3$. This broad-banding effect is not yet fully understood from available performance data and other electrical measurements made, but the result is highly beneficial and is particularly pronounced in the multiple bay antennas illustrated in Figs. 4 to 12 inclusive.

The value of the antenna of Fig. 3 for television reception is greater than might be expected because of the fortuitous relative location in the radio frequency spectrum of the low and high sections of the established V. H. F. television band and of the U. H. F. television band. As noted above, the low V. H. F. band runs from 54 to 88 mc., the center of this band being about 70 mc. The high V. H. F. band runs from 174 mc. to 216 mc., the center of this band being about 195 mc. or only slightly less than three times the frequency of the center of the low V. H. F. band. The U. H. F. bands runs from 470 mc. to 890 mc., the center of this band being about 680 mc. or only slightly greater than three times the frequency of the center of the high V. H. F. band.

Looking now at the relative wave lengths of the currents $I_1$, $I_2$, and $I_3$ in Fig. 3, it will be observed that the wave length of $I_2$ is about one-third the wave length of $I_1$ so that the frequency of $I_2$ is about three times that of $I_1$. Similarly, the frequency of $I_3$ is about three times that of $I_2$. Thus, if the main collinear elements 21, 22, and 23 are made resonant to about 200 mc., the half-wave dipole comprising the entire antenna will be resonant to about 67 mc., and the sub-collinear elements 21a, 21b, and 21c will be resonant to about 600 mc. Therefore, these resonant frequencies of the antenna, in the order named, fall close to the centers of the high V. H. F. band, the low V. H. F. band, and the U. H. F. band, respectively. From this relationship, it will be immediately obvious that the three different frequencies to which the antenna of Fig. 3 will give maximum response, are practically the ideal frequencies to make the antenna of the greatest possible value for all three television bands. So long as the main collinear elements 21, 22, and 23 and stubs 29 and 30 are dimensioned so that the frequency of the optimum current $I_2$ is in the range from about 174 to 216 mc. (in the high portion of the V. H. F. band), the various other physical and electrical values may be so adjusted that the frequency of the current $I_1$ will be some place within the low portion of the V. H. F. range (54–88 mc.) and the frequency of the current $I_3$ will be some place within the U. H. F. range (470–890 mc.). Accordingly, in all of the various embodiments of the present invention, for television reception purposes, the main elements 21, 22, and 23 and stubs 29 and 30 may advantageously be designed for optimum in-phase operation at a frequency in the range from about 174 to 216 mc.

Another fortuitous advantage of the antenna of Fig. 3 is the little understood broad-banding effect of the main stubs 29 and 30 and outer elements 22 and 23 at frequencies above and below the frequency of $I_3$ in the U. H. F. range. This extends the usefulness of the antenna over a larger part of this relatively broad range from 470 to 890 megacycles.

A further outstanding feature of the antenna of Fig. 3 is the ease with which the point of maximum response in the U. H. F. band may be varied as may be desired in different geographical areas. Though the exact explanation is by no means clear, I have found that this point of maximum response may be varied with no appreciable change in gain by shifting the locations of the small stubs 33 and 34 a little closer together or a little farther apart. Moving them closer together raises the frequency of maximum response somewhat, while moving them farther apart lowers the frequency of maximum response. Small changes in the developed length of the stubs 33 and 34 and in the lengths of the gaps 26, 27, 28, 31, and 32 may be made to effect similar changes in performance in the U. H. F. band. Thus, though I have illustrated and described the antenna of Fig. 3 as having the stubs 33 and 34 ideally located in the center element so that the subcollinear elements 21a, 21b, and 21c are of substantially the same resonant length, this relationship is not essential and may be advantageously varied to a considerable degree. Similarly the point of maximum response may be shifted and the flatness of the gain curve in the high V. H. F. band may be increased or decreased within limits by slight alterations in the various relative dimensions of the collinear elements 21, 22, and 23 and the stubs 29 and 30. Accordingly, it should be understood that the several relationships between the frequencies to which the elements are tuned, which are determined by their relative physical dimensions, need only approximate the theoretically ideal relationships. References to such relationships in the appended claims, therefore, should be interpreted accordingly.

Figure 4:
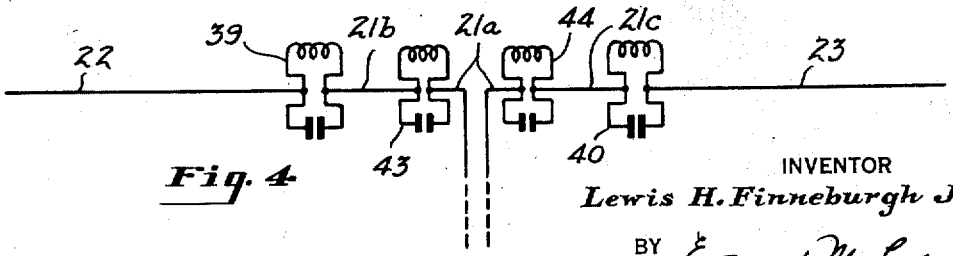
Fig. 4 is a diagrammatic illustration of a three-element collinear antenna similar to the one illustrated in Fig. 3 but employing, as phase reversing means, the same kind of anti-resonant circuits employed for a different purpose in the antenna of Fig. 2.

Referring now to Fig. 4, the antenna illustrated therein is identical with that of Fig. 3, except for the substitution of correspondingly tuned inductor-capacitor loops 39, 40, 43, and 44 for the large stubs 29 and 30 and for the small stubs 33 and 34. Therefore, the antennas of Figs. 3 and 4 are substantially equivalent electrically and no further description of Fig. 4 should be necessary.

As explained above, quarter-wave shorted stubs (approximately half-wave developed lengths) and appropriately tuned inductor capacitor loops may be interchanged without altering the general mode of operation of the antenna. It should also be noted that several specific forms of inductor-capacitor loops may be employed, as shown in Figs. 5 and 6 of Patent No. 2,282,292 to Amy and Aceves, mentioned above. Still other variations of these anti-resonant circuits may be employed, as will be recognized by those skilled in the art. However, both because of greater economy of manufacture and structural simplicity, I prefer to employ quarter-wave shorted stubs as anti-resonant circuits for the purpose of the present invention.

From the foregoing disclosure, it will be appreciated that this invention extends the range of usefulness of a three-element collinear antenna by converting it from one responsive in only two frequency ranges to one responsive in three frequency ranges, while retaining all of the other desirable characteristics of this type of antenna. It will also be appreciated that the relationship of the three ranges is ideal for rendering the resulting antenna of the greatest possible value in all three of the separated frequency ranges now employed for television broadcasting.

Referring next to Fig. 5, this figure illustrates the application of the present invention to the antenna described and claimed in my prior Patents 2,566,287 and 2,630,531. For simplicity, the reflectors, the supporting structure, and the collapsing feature disclosed in those patents have been omitted from Fig. 5, and only the basic electrical circuit is shown.

The antenna of Fig. 5 comprises identical upper and lower arrays, each including three main collinear elements 51, 52, and 53. The antenna is driven through a pair of parallel transverse feeders 54 and 55 that are connected to the central collinear element 51 of each array at opposite sides of a center feed gap 56 therein. The transverse feeders are preferably approximately the same length as the individual collinear elements 51, 52, and 53, and the leads 68 and 69 of a two-conductor transmission line are respectively connected to the mid-points of the transverse feeders 54 and 55. Additional pairs of parallel transverse conductors 61 and 62 are respectively connected to the adjacent ends of the collinear elements of the upper array at opposite sides of the gaps 57 and 58 therebetween, and to corresponding points on the lower array. A shorting conductor 63 is connected across the mid-points of each pair of transverse conductors 61 and 62, thus forming a common shorting element for a pair of oppositely facing, phase reversing stubs which function as anti-resonant circuits for the upper and lower arrays.

The central collinear element 51 in each array is provided with additional gaps 64 and 65 on opposite sides of the feeder conductors 54 and 55, and these gaps are respectively bridged by anti-resonant circuits in the form of small shorted stubs 66 and 67. In this case, the gaps 64 and 65 in each central collinear element 51 are so located that the central sub-element 51a of each central element 51 is slightly more than twice the length of the outer sub-elements 51b and 51c thereof. The developed length of the small stubs 66 and 67 may be selected to make them anti-resonant at a frequency in the range in which the sub-elements 51a, 51b, and 51c are resonant as half-wave elements. In most cases, however, for reasons that will be explained, the small stubs 66 and 67 should be designed to be anti-resonant at approximately the frequency at which the central sub-element 51a is resonant as a half-wave element.

The mode of operation of the antenna of Fig. 5 is essentially the same in most respects as a pair of vertically stacked antennas of the type shown in Fig. 3, connected in parallel. Accordingly, to that extent, its mode of operation has already been sufficiently described. One difference in operation is due to the back-to-back relationship of the main phase-reversing stubs of the upper and lower arrays, with the shorting conductors 63 forming common elements of the oppositely facing pairs of main stubs. As disclosed in my prior Patents 2,566,287 and 2,630,531, this has a remarkable broad-banding effect on the antenna. The other principal difference is that the modified positions of the gaps 64 and 65, described above, shift the point of maximum response to a lower frequency in the highest of the three frequency ranges for which the antenna is designed. Though the physical lengths of the outer sub-elements 51b and 51c are shorter than the physical length of the central sub-element 51a, the antenna neverthless still functions at the fundamental resonant frequency of the sub-element 51a as a three-element collinear antenna, which may be confirmed by its response pattern and by the shape of its gain curve. This is believed to be due to the fact that, under such conditions, the main stubs bridging the gaps 57 and 58 do not entirely cut off the outer main collinear elements 52 and 53, and that the composite result is an effective increase in the resonant lengths of the outer sub-elements 51b and 51c to approximately the resonant length of the central sub-element 51a.

While the antenna of Fig. 5 tends to peak in the highest frequency range at about the fundamental frequency of the central sub-element 51a, its gain is remarkably high over a surprisingly broad range above that fundamental frequency. The reason for this is not at all clear and the theoretical factors to be considered are most complex. However, it may be that, in the upper portion of the highest frequency range, the two halves of the central sub-element 51a and the outer sub-elements 51b and 51c operate substantially in-phase as a four element collinear antenna, rather than a three element collinear antenna.

If desired, to permit collapsing of the antenna in the manner described in my prior Patents 2,566,287 and 2,630,531, the small stubs 66 and 67 in the central element 51a of each array may be disposed in a horizontal plane. In this case, the small stubs 66 and 67, as well as the transmission line leads 68 and 69, as seen in the fragmentary plan view of Fig. 6, may extend rearwardly from the principal vertical plane of the antenna, the latter plane being normal to the plane of the paper in this view.

In order to convert the antenna of my prior Patents Nos. 2,566,287 and 2,630,531 designed for V. H. F. operation to one that will also operate effectively in the U. H. F. range in accordance with Fig. 5 or 6 of this application, it is merely necessary to modify the two parts in each collinear array that jointly constitute the central collinear element of the antenna of my prior patents (corresponding to central element 51 in Fig. 5 or 6 hereof). A preferred substitute element for this purpose is shown in detail in Figs. 7 and 8 hereof, two such elements being required in each collinear array. Fig. 7 shows such an element in plan as it would be positioned in the antenna with a shorted stub extending rearwardly in a horizontal plane; and Fig. 8 shows the element in elevation with end loops disposed in a vertical plane for receiving attaching screws, whereby the attaching screws may serve as hinge pintles having horizontal axes. Assuming a physical overall length of 28 inches for the central collinear element 51 in Fig. 5, and allowing for the central gap 56, the substitute parts 51, constructed as in Figs. 7 and 8, would each have an overall physical length of about 13¼ inches. The substitute part may comprise two aligned portions or legs 51t and 51u of about 6⅛ inches, separated by a gap 51v of about 1 inch and connected by an integrally formed shorted stub 51s having a developed length of about 11 inches. The opposite ends of the part 51r may be formed into the loops 51w for receiving the attaching hinge pintle screws 51x, the plane of the stub 51s being normal to the plane of the loops 51w.

By making the elements 51r with equal legs 51t and 51u, instead of with unequal legs as in the parts of the central element 21 in Fig. 3, they can be sent into the field for substitution in existing antennas by unskilled persons without danger from reversing the parts end-for-end. This is not essential, however, nor is it necessarily preferred for all situations. Depending upon where maximum response in the three operative frequency ranges is desired and other design considerations, various changes both in overall dimensions and relative proportions may be desired. Thus, for a television antenna having its intermediate frequency range in the high V. H. F. band, the overall length of the element 51r may range from about 11 to about 16 inches, the center gap therein might range from ½ to 3 or 4 inches, and the developed length of the stub 51s may range from as little as 6 inches to as much as 15 or 16 inches, depending in part on its location and in part upon the gap width, which affects the relationship between developed stub length and the frequency at which the stub is anti-resonant. The developed length of the element 51r may range from about 18 to about 30 inches, and the developed length of the stub 51s may range from about 65% to about 120% of the sum of the lengths of the aligned legs 51t and 51u.

Referring next to Fig. 9, a variation of the antenna of Fig. 5 is shown in which a different system is employed for phasing the main radiating elements 71, 72, and 73 in each of two collinear arrays. The modified phasing system is that employed in a conventional Sterba array, each center element 71 in each set of aligned conductors having its extremities respectively connected to the inner ends of the elements 72 and 73 in the other set. These connections are made by two pairs of generally vertical, transverse conductors 70 that cross each other at their mid-points and are electrically separated where they cross. The spacing of the upper and lower sets of aligned conductors is such that the transverse conductors 70 are of substantially the same length as the main radiating conductors 71, 72, and 73. Thus, when the antenna is operating at the resonant frequency at which the main radiating elements are resonant as half-wave conductors, the transverse conductors 70 also operate as half-wave elements and perform a phase reversing function similar to the oppositely facing stubs in the antenna of Fig. 5. In this case, however, the centermost element 71 in one set of aligned conductors is connected in series with the outer elements 72 and 73 in the other set. Thus each collinear array may be viewed as comprising the center conductor of one aligned set and the outer conductors of the other aligned set, the term "collinear" array being employed in its broad sense to mean an array of conductors connected end-to-end for substantially in-phase operation by phase reversing conductors or circuits.

The centermost element 71 in each collinear array is provided with a pair of gaps 74 and 75, respectively located on opposite sides of a pair of vertical feeder conductors 76 and 77 to divide the centermost element into three generally collinear portions or sub-elements 71a, 71b, and 71c. While these portions 71a, 71b, and 71c are shown as being of substantially the same physical lengths so as to produce substantially the same resonant lengths, it will be understood that the resonant length of the central portion 71a may be either somewhat greater or somewhat smaller than the resonant lengths of the outer portions 71b and 71c. The gaps 74 and 75 in each center element 71 are respectively bridged by small stubs 78 and 79, preferably dimensioned in accordance with the considerations mentioned in discussing the small stubs 66 and 67 of the antenna of Fig. 5.

The effect of providing the gaps 74 and 75 and the small stubs 78 and 79 in the center element 71 in both collinear arrays of Fig. 9, is substantially the same as in the antenna of Fig. 5 in causing the central portions or sub-elements of the two arrays to function as a pair of three-element collinear arrays at a frequency roughly approximating three times the fundamental resonant frequency of the elements 71, 72, and 73.

Fig. 10 is a fragmentary plan view showing an optional construction of the antenna of Fig. 9 in which the main radiating elements 71, 72, and 73 are not rectilinear elements as is customary with most collinear antennas. As shown in Fig. 10, each of these main radiating elements may comprise two portions that are angularly disposed in a horizontal plane so that they still appear to be rectilinear elements as viewed in elevation from a transmitting station. The effective resonant lengths of such radiating elements are, for practical purposes, substantially equal to their projected lengths on a horizontal line in the plane of the paper in Fig. 9. Thus, the angularity shown in Fig. 10 has little, if any, practical effect on the phase relationships of the currents in the various conductors, and in this respect, they operate substantially as rectilinear elements of the lengths shown in Fig. 9. Such deviations from true rectilinear shapes have been employed commercially, though it may be questioned that any advantageous results are achieved thereby. For the purposes of the present invention, however, this optional construction represents a substantial equivalent of a rectilinear construction and may be employed in any of the various other forms of antennas shown and described herein.

Fig. 11 shows still another variation of the antenna of Fig. 5, the difference again residing merely in the manner in which the three main collinear elements in each array are connected for in-phase operation. In Fig. 11 the phasing circuit comprises a pair of closely spaced transverse conductors 83 and 84 corresponding to the conductors 61 and 62 in the antenna of Fig. 5. A pair of shorting conductors 85 and 86 respectively connect the transverse conductors 83 and 84 at spaced locations on opposite sides of their mid-points. Viewing this phasing circuit as a pair of oppositely facing phase reversing stubs, each being connected to points of zero current and maximum voltage at adjacent ends 87 and 88 of a pair of collinear elements in the upper or lower array, it will be noted that (due to the 90° phase difference between voltage and current) the currents in the stubs are a maximum and the voltages a minimum at the centers of the shorting conductors 85 and 86, and that the shorting conductors 85 and 86 are at substantially the same relatively low potentials at corresponding points along their lengths. As a result, substantially no current will pass through the portions 83a and 84a of the transverse conductors 83 and 84 extending between the shorting conductors 85 and 86 of equal electrical potential. These conductor portions 83a and 84a therefore serve no electrical function. However, they may serve a mechanical function if the shorting conductors 85 and 86 are slidably clamped to the transverse conductors 83 and 84 so that they may be moved closer together or further apart to vary the lengths of the oppositely facing stubs as disclosed in U. S. Patent No. 2,112,269 to Carter.

The antenna of Fig. 11 is driven in the same manner as the antennas of Figs. 5 and 7 by a pair of centrally disposed transverse feeders 89 and 90, and two additional stubs 91 and 92 are interposed in the central collinear element 81 in each array in the same manner and for the same purpose as in the antennas of Figs. 5 and 9.

Electrically the antenna of Fig. 11 is substantially the same as two arrays of antennas of the type shown in Fig. 3 connected in parallel through the feeding conductors 89 and 90 to enhance the gain in all three of the operative frequency ranges.

Up to this point, the antennas shown and described have all comprised an odd plurality of generally collinear radiating elements in each array. This is preferred because it permits the feeding conductors to be connected adjacent a point of minimum voltage (maximum current) at the center of each array, and this makes it unnecessary to employ any special device or circuit to adjust the impedance of the transmission line to match the variable impedance of the antenna as the frequency of operation is changed. This is an important advantage for television reception where a receiving set may be switched back and forth from channel to channel over a wide frequency range. However, when the necessity for employing an impedance matching device in the transmission line is not objectionable, the present invention may also be employed to advantage in an array of an even plurality of generally collinear conductors, as illustrated in Fig. 12.

Referring to Fig. 12, the collinear array may comprise four collinear elements 101, 102, 103, and 104 of substantially the same resonant length. The array is preferably driven at its center by a pair of transmission line conductors or feeders 105 and 106 connected to adjacent ends of the centermost pair of collinear elements 101 and 102, with a suitable impedance matching device 107 inserted in the transmission line. The four collinear elements may then be connected for in-phase operation at the fundamental resonant frequency of the elements by a pair of quarter-wave shorted stubs 109 and 110. As will be apparent from the foregoing disclosure, the antenna will then operate in-phase as a four element collinear array at the fundamental resonant frequency of the individual collinear elements, and as a half-wave dipole at the frequency at which the entire antenna is resonant as a half-wave element.

In accordance with the present invention, gaps 111 and 112 may be provided in the centermost elements 101 and 102 to divide them into sub-elements 101a, 101b, 102a, and 102b. These sub-elements are preferably, though not necessarily, of the same resonant length. Gaps 111 and 112 may be bridged with small shorted stubs 113 and 114 designed to be anti-resonant in the range of frequencies to which the sub-elements are resonant as half-wave elements. In this manner, the sub-elements 101a, 101b, 102a, and 102b, together with the small stubs 113 and 114, will function as a four element collinear antenna and peak at a frequency roughly twice the fundamental resonant frequency of the main collinear elements 101, 102, 103, and 104.

The three optimum frequencies to which the antenna of Fig. 12 will respond as described are, of course, in a quite different ratio than those at which a three-element collinear system will peak. These frequencies for the antenna of Fig. 12 will be in a ratio roughly 1:4:8 instead of roughly 1:3:9 as in the antenna of Figs. 3 and 4. It will also be understood that the main stubs 109 and 110 and small stubs 113 and 114 may be replaced with other equivalent anti-resonant circuits if desired.

To illustrate still another variation of standard collinear antennas to which the invention is applicable, Fig. 13 shows the invention added to another known type of antenna. This antenna operates essentially as an in-phase collinear antenna at a selected frequency, though the radiating elements are not rectilinear and do not appear so when viewed in elevation from the direction in which the antenna would be pointed.

Though strikingly different in appearance, the antenna of Fig. 13 is essentially the same as the antenna of Fig. 5, but distorted in a vertical plane. Thus, ignoring for the moment any effects from such distortion, the antenna comprises an upper array of generally collinear, radiating conductors 121, 122, and 123, and a lower corresponding array, each adjacent pair of individual elements in each array having angularly disposed portions that converge toward the opposite array.

The two arrays are driven through a pair of vertical feeding conductors 124 and 125 connected to each array at opposite sides of a center feed gap 126. The generally collinear elements 121, 122, and 123 are separated by gaps 127 and 128, and each of these gaps is bridged by an angularly disposed and distorted, shorted stub 130 having a pair of parallel legs 130a and 130b and a horizontal shorting conductor 130c that is common to each opposite pair of stubs in the two arrays. Though its exact electrical characteristics can easily be determined only experimentally because of its distorted shape, each stub 130 will closely approximate a conventional shorted stub of similar proportions in actual operation. The side 130a of each stub 130 that is connected to the central, generally collinear element 121 is a rectillinear extension of that central element. Though the exact points of termination of the central element 121 and the beginnings of stub legs 130a may be difficult to determine and, theoretically, may vary somewhat at different frequencies, they may be assumed to be approximately at the points designated x in the drawing at the fundamental resonant frequency of the central elements 121. The stubs 130 are selected to be anti-resonant at approximately the fundamental resonant frequency of the individual, generally collinear elements 121, 122, and 123 by varying the angular relationships and lengths of the various conductors and comparing the response pattern of the antenna with one of the type shown in Fig. 5.

In accordance with the present invention an additional pair of smaller stubs 131 and 132 is interposed in each central radiating element 121, dividing it into three sub-elements 121a, 121b, and 121c. These sub-elements may be of substantially the same individual overall length (including feed gap 126 in sub-element 121a), or their relative lengths may be varied somewhat as in the case of the other embodiments of the invention described above. Similarly, the proportions and developed length of the small stubs 131 and 132 may be varied within the range of fundamental frequencies of the three sub-elements separated thereby. Also, the small stubs 131 and 132 may extend toward each other in a vertical plane, as shown, or may be disposed at any angle.

To clarify the close operational similarity of the antennas of Figs. 5 and 13, it is to be noted that, for practical purposes, only the horizontal components of the radiating elements 121, 122, and 123 are effective as radiating (or receiving) elements for a television wave, which is horizontally polarized. Accordingly, in Fig. 14, these projected lengths are shown with corresponding reference characters applied thereto. When the antenna of Fig. 13 is operating at the fundamental frequency of each complete array, functioning as a half-wave dipole, the current in the antenna is approximately represented by the curve $I_1$ in Fig. 14. At the fundamental resonant frequency of the individual, generally collinear elements 121, 122, and 123, the currents in these radiating elements will be approximately in-phase as represented by the curves $I_2$ in Fig. 14. At still higher frequencies aproximating the resonant frequencies of the individual sub-elements 121a, 121b, and 121c, the currents therein will be substantially in-phase as represented by the curves $I_3$ in Fig. 14. (Compare current relationships in Fig. 3.) As is the case with the antennas of Figs. 3, 4, 5, 9, and 11, the antenna of Figs. 13 will peak at three optimum frequencies in the approximate ratio of 1:3:9. It will be effective over a limited range above and below each optimum frequency, though my tests have shown the gain of the antenna of Fig. 13 to be substantially lower over the entire useful ranges thereof than the gain of the preferred form shown in Fig. 5.

In all seven of the antennas of Figs. 3, 4, 5, 9, 11, 12, and 13, gaps are provided in the centermost, main collinear element or elements of each array to form a number of sub-elements, and these gaps are bridged by anti-resonant circuits tuned to a frequency in the range of the fundamental resonant frequencies of the sub-elements. In all seven of these antennas, the result is to render them responsive in an additional, higher frequency range and thus increase their utility for television or radio reception. It will be appreciated, therefore, that I have provided a novel scheme for modifying antennas designed for operation as a half-wave dipole in a low frequency range and as a collinear antenna in an intermediate frequency range, by incorporating additional circuits which produce in-phase collinear operation of a portion of the antenna in a third, higher frequency range, without interfering in any material respect with the operation in the low and intermediate ranges. It will also be appreciated from the several embodiments of the invention disclosed herein, that the invention is applicable to a variety of forms and variations of conventional collinear antennas, involving different systems for effecting in-phase operation in the intermediate frequency range. Accordingly, the invention is not intended to be limited to the particular details shown and described for illustrative purposes, except as may be required by the terms of the appended claims.

Having described my invention, I claim:

[1. An antenna comprising a plurality of radiating conductor elements of substantially equal resonant length disposed in longitudinally spaced relationship, means connecting said conductor elements for substantially in-phase operation as a collinear array at one frequency, and means interposed in at least one of said conductor elements for connecting portions thereof for in-phase operation as a collinear array at a substantially higher frequency.]

[2. An antenna comprising a plurality of radiating conductor elements of substantially equal resonant length disposed in longitudinally spaced relationship, circuit means connecting said conductor elements as a collinear array for substantially in-phase operation as half-wave elements at a selected frequency, a plurality of anti-resonant circuits interposed in and forming a part of at least one of said conductor elements to divide it into three conductor portions, said anti-resonant circuits having a relatively low impedance at said selected frequency and maximum impedance at a substantially higher frequency.]

[3. An antenna comprising a plurality of radiating conductor elements of substantially equal resonant length disposed in longitudinally spaced relationship, circuit means connecting said conductor elements as a collinear array for substantially in-phase operation as half-wave elements at a selected frequency, a plurality of anti-resonant circuits interposed in and forming a part of at least one of said conductor elements to divide it into three conductor portions, said anti-resonant circuits having a relatively low impedance at said selected frequency and maximum impedance at a substantially higher frequency substantially corresponding to the half-wave resonant frequency of at least one of said three conductor portions.]

[4. An antenna comprising a plurality of radiating conductor elements of substantially equal resonant length disposed in longitudinally spaced relationship, circuit means connecting said conductor elements as a collinear array for substantially in-phase operation as half-wave elements at a selected frequency, a plurality of anti-resonant circuits interposed in and forming a part of at least one of said conductor elements to divide it into three conductor portions, said anti-resonant circuits having a relatively low impedance at said selected frequency and maximum impedance at a substantially higher frequency substantially corresponding to the half-wave resonant frequency of the one of said conductor portions extending between said anti-resonant circuits.]

[5. An antenna comprising a plurality of conductor elements disposed in longitudinally spaced relationship, means connecting said elements as a collinear array for substantially in-phase operation as half-wave elements at a selected frequency, and at least one pair of anti-resonant circuits respectively interposed in conductor elements of said array on opposite sides of the center of the array, said anti-resonant circuits being selected to have a relatively low impedance at said selected frequency and substantially infinite impedance at a substantially higher frequency, and said anti-resonant circuits being interposed in said array at locations selected to produce substantially in-phase operation at said higher frequency of portions of said conductor elements connected to said anti-resonant circuits.]

[6. An antenna comprising a plurality of conductor elements disposed in longitudinally spaced relationship, means connecting said elements as a collinear array for substantially in-phase operation as half-wave elements at a selected frequency, including a pair of feeding conductors connected to said array adjacent the center thereof, and at least two anti-resonant circuits respectively interposed in said array at locations symmetrically disposed on opposite sides of said feeding conductors for producing substantially in-phase operation at a frequency substantially higher than said selected frequency of portions of said array to which said anti-resonant circuits are connected.]

7. An antenna comprising an array of at least three radiating conductor elements of substantially equal resonant lengths disposed in longitudinally spaced relationship, phasing means connecting said elements for substantially in-phase operation as half-wave elements at a selected frequency, and at least two anti-resonant circuits respectively interposed in said array inwardly between said phasing means, said anti-resonant circuits having a relatively low impedance at said selected frequency and substantially infinite impedance at a substantially higher frequency and being symmetrically interposed in said array on opposite sides of the center thereof at locations selected to produce substantially in-phase operation at said higher frequency of the conductor portions of said array extending between said phasing means.

8. An antenna comprising an array of an odd plurality of conductor elements in longitudinally spaced relationship, means connecting said elements for substantially in-phase operation as half-wave elements at a selected fundamental frequency, the central one of said elements having a central feed gap and a pair of feeding conductors connected thereto at opposite sides of said feed gap, said central one of said elements having a pair of additional gaps therein respectively disposed on opposite sides of said feed gap, and anti-resonant circuits bridging said additional gaps, said anti-resonant circuits having a relatively low impedance at said selected frequency and a substantially infinite impedance at a substantially higher frequency to produce substantially in-phase operation at said higher frequency of conductor portions separated by said additional gaps.

9. An antenna according to claim 8 in which there are two of said arrays of substantially identical form disposed in vertically spaced relationship and connected in parallel by said feeding conductors, the means for connecting the longitudinally spaced conductor elements in each array for in-phase operation at said selected fundamental frequency comprising vertically extending shorted stubs with a single conductor shorting each pair of corresponding stubs in the upper and lower arrays, and in which said anti-resonant circuits in each array are shorted stubs separated from the corresponding stubs of the other array.

10. An antenna according to claim 8 in which there are two of said arrays of substantially identical form disposed in vertically spaced relationship and connected in parallel by said feeding conductors, the means for connecting the longitudinally spaced conductor elements in each array for in-phase operation at said selected fundamental frequency comprising vertically extending shorted stubs with a single conductor shorting each pair of corresponding stubs in the upper and lower arrays, and in which said anti-resonant circuits in each array are shorted stubs separated from the corresponding stubs of the other array, the stubs constituting said anti-resonant circuits being disposed in horizontal planes.

11. An antenna according to claim 8 in which there are two of said arrays of substantially identical form with the central one of said longitudinally spaced conductor elements in each array transversely offset from the adjacent outer conductor elements in that array and in substantial longitudinal alignment with the corresponding outer conductor elements in the other array, the longitudinally spaced conductor elements in each array being connected for in-phase operation at said selected frequency by generally transverse phasing conductors that are substantially half-wave elements at said selected frequency, and in which said anti-resonant circuits are shorted stubs.

12. An antenna according to claim 8 in which there are two of said arrays of substantially identical form with the central one of said longitudinally spaced conductor elements in each array transversely offset from the adjacent outer conductor elements in that array and in substantial longitudinal alignment with the corresponding outer conductor elements in the other array, the longitudinally spaced conductor elements in each array being connected for in-phase operation at said selected frequency by generally transverse phasing conductors that are substantially half-wave elements at said selected frequency, and each of said longitudinally spaced conductor elements in each array comprising two substantially equal portions that are angularly disposed in a plane generally transverse with respect to said phasing conductors, and in which said anti-resonant circuits are shorted stubs.

13. An antenna according to claim 8 in which there are two of said arrays of substantially identical form disposed in vertically spaced relationship and connected in parallel by said transverse feeding conductors, the means for connecting the longitudinally spaced conductor elements in each array for in-phase operation at said selected frequency comprising shorted stubs disposed opposite and extending vertically toward the corresponding stubs in the other array with the shorting members of the stubs of each opposite pair spaced apart, and in which said anti-resonant circuits in each array are shorted stubs.

14. An antenna according to claim 8 in which there are two of said arrays of substantially identical form disposed in vertically spaced relationship and connected in parallel by said transverse feeding conductors, the means for connecting the longitudinally spaced conductor elements in each array for in-phase operation at said selected frequency comprising shorted stubs disposed opposite and extending vertically toward the corresponding stubs in the other array with the shorting members of the stubs of each opposite pair spaced apart and connected together at their extremities by extensions of the vertically extending portions of said stubs, and in which said anti-resonant circuits in each array are shorted stubs.

15. An antenna according to claim 8 in which there are two of said arrays of substantially identical form disposed in vertically spaced relationship and connected in parallel by said feeding conductors, adjacent longitudinally spaced conductor elements in each array having conductor portions extending toward the other array in converging relationship, the means for connecting the longitudinally spaced conductor elements in each array for in-phase operation at said selected frequency comprising shorted stubs each having a pair of spaced conductors extending toward the corresponding stubs of the other array along inclined parallel lines, each opposite pair of said stubs being connected to and shorted by a common horizontal conductor, and one of the pair of spaced conductors of each of said stubs being a rectilinear continuation of the central one of said longitudinally spaced conductor elements, and in which said anti-resonant circuits in each array are shorted stubs separated from the corresponding stubs of the other array.

16. An antenna according to claim 8 in which there are two of said arrays of substantially identical form disposed in vertically spaced relationship and connected in parallel by said feeding conductors, adjacent longitudinally spaced conductor elements in each array having conductor portions extending toward the other array in converging relationship, the means for connecting the longitudinally spaced conductor elements in each array for in-phase operation at said selected frequency comprising shorted stubs each having a pair of spaced conductors extending toward the corresponding stubs of the other array along inclined parallel lines, each opposite pair of said stubs being connected to and shorted by a common horizontal conductor and one of the pair of spaced conductors of each of said stubs being a rectilinear continuation of the central one of said longitudinally spaced conductor elements, and in which said anti-resonant circuits in each array are shorted stubs separated from the corresponding stubs of the other array, the stubs constituting said anti-resonant circuits being disposed in a vertical plane.

[17. An antenna comprising an array of an even plurality of radiating conductors of substantially equal resonant lengths disposed in longitudinally spaced relationship, means including a pair of transmission line conductors connecting said elements of said array for substantially in-phase operation as half-wave elements at a selected frequency, and a pair of anti-resonant circuits respectively interposed in radiating conductors of said array on opposite sides of said transmission line conductors, said anti-resonant circuits having a relatively low impedance at said selected frequency and substantially infinite impedance at a substantially higher frequency and being interposed at location selected to produce substantially in-phase operation at said higher frequency of a pair of radiating conductor portions respectively disposed between said anti-resonant circuits on opposite sides of said transmission line conductors.]

[18. An antenna comprising an array of an even plurality of radiating conductors of substantially equal resonant lengths disposed in longitudinally spaced relationship, means including a pair of transmission line conductors connecting said elements of said array for substantially in-phase operation as half-wave elements at a selected frequency, and a pair of anti-resonant circuits respectively interposed in radiating conductors of said array on opposite sides of said transmission line conductors, said anti-resonant circuits having a relatively low impedance at said selected frequency and substantially infinite impedance at a substantially higher frequency and being interposed at locations selected to produce substantially in-phase operation at said higher frequency of four radiating conductor portions each of which is connected to one of said anti-resonant circuits.]

[19. An antenna comprising an array of an even plurality of radiating conductors of substantially equal resonant lengths disposed in longitudinally spaced relationship, phasing means connecting pairs of said elements for substantially in-phase operation as half-wave elements at a selected frequency, including a pair of transmission line conductors respectively connected to adjacent ends of the centermost pair of said elements, and a pair of anti-resonant circuits respectively interposed in said centermost pair of said elements for dividing each into separated inner and outer parts, each of said anti-resonant circuits being a shorted stub having a relatively low impedance at said selected frequency and substantially infinite impedance at a substantially higher frequency in the range in which said inner and outer parts are resonant as half-wave elements for producing substantially in-phase operation at said higher frequency of said inner and outer parts.]

20. An antenna comprising an odd plurality of conductor elements in longitudinally spaced relationship, said elements being resonant as half-wave elements at substantially the same selected fundamental frequency, a plurality of anti-resonant circuits tuned to substantially the same selected frequency and respectively bridging the gaps between adjacent pairs of said conductor elements, the central one of said conductor elements having a pair of gaps therein respectively located on each side of its center to divide it into three longitudinally spaced portions resonant as half-wave elements in a substantially higher frequency range than said selected frequency, and a pair of anti-resonant circuits bridging said gaps in said central conductor element for effecting substantially in-phase operation of said longitudinally spaced portions thereof in said higher frequency range.

21. An antenna comprising an odd plurality of generally collinear, radiating elements in longitudinally spaced relationship, said elements being resonant as half-wave elements at substantially the same selected fundamental frequency, a plurality of anti-resonant circuits tuned to substantially the same selected frequency and respectively bridging the gaps between adjacent pairs of said collinear elements, a pair of feeding conductors connected to said central collinear element at spaced points adjacent the center thereof, a pair of gaps in said central collinear element respectively located on opposite sides of said pair of feeding conductors to divide said central collinear element into a plurality of longitudinally spaced collinear portions resonant as half-wave elements to fundamental frequencies in a range from about three to four times said selected fundamental frequency, and a pair of anti-resonant circuits tuned to a frequency in said range and respectively bridging said additional gaps in said central collinear element.

22. An antenna comprising an odd plurality of generally collinear, radiating elements in longitudinally spaced relationship, said elements being resonant as half-wave elements at substantially the same selected fundamental frequency, a plurality of phase reversing stubs tuned to substantially the same selected frequency and respectively bridging the gaps between adjacent pairs of said collinear elements, a pair of feeding conductors connected to spaced points adjacent the center of the central one of said collinear elements, a pair of gaps in said central collinear element respectively located on opposite sides of said pair of feeding conductors for dividing said central collinear element into three longitudinally spaced collinear portions which are resonant to frequencies in a range substantially higher than said selected frequency, and an additional pair of phase reversing stubs tuned to a frequency in said range and respectively bridging the gaps in said central collinear element.

23. An antenna comprising an odd plurality of generally collinear, radiating elements in longitudinally spaced relationship, said elements being resonant as half-wave elements at substantially the same selected fundamental frequency, a plurality of phase reversing stubs tuned to substantially the same selected frequency and respectively bridging the gaps between adjacent pairs of said collinear elements, the central one of said collinear elements having a center gap therein, a pair of feeding conductors connected to said central collinear element at opposite sides of said center gap, a pair of additional gaps in said central collinear element respectively located on opposite sides of said pair of feeding conductors for dividing said central collinear element into a plurality of spaced collinear portions, and an additional pair of phase reversing stubs respectively bridging said pair of additional gaps and tuned to a frequency in the range in which said spaced collinear portions are resonant as half-wave elements.

24. An antenna comprising three generally collinear, radiating elements in longitudinally spaced relationship, each of said collinear elements being resonant as a half-wave element at a selected frequency in the range of about 174 to 216 megacycles, a plurality of phase reversing stubs tuned to frequencies in said range and respectively bridging the gaps between adjacent pairs of said collinear elements, the central one of said collinear elements having a center gap therein, a pair of feeding conductors connected to said central collinear element at opposite sides of said center gap, a pair of additional gaps in said central collinear element respectively located on opposite sides of said pair of feeding conductors to divide said central collinear element into three longitudinally spaced collinear portions each resonant as a half-wave element at a frequency in the range of 470 to 890 megacycles, and an additional pair of phase reversing stubs tuned to a frequency in the range of 470 to 890 megacycles and respectively bridging said pair of additional gaps, said resonant frequency values being selected so that the three collinear elements and the stubs connected thereto will operate substantially as a half-wave dipole at a frequency in the range of 54 to 88 megacycles, and will operate substantially as a three element collinear antenna in both the intermediate and highest of said ranges.

25. An antenna comprising an upper array of three generally collinear radiating elements in longitudinally spaced relationship, said elements being resonant as half-wave elements at substantially the same selected frequency, a lower corresponding array spaced from said upper array in transversely aligned relationship therewith, a pair of parallel transverse feeding conductors connecting symmetrically spaced points adjacent the center of said upper array to corresponding points on said lower array, two pairs of generally transverse phasing conductors respectively located on opposite sides of said feeding conductors, said phasing conductors connecting said collinear conductors of both the upper and lower arrays for substantially in-phase operation at their resonant frequency, the central one of said collinear elements in each of said arrays having a pair of gaps therein respectively located on opposite sides of said pair of feeding conductors for dividing said central collinear element into three longitudinally spaced, generally collinear portions, and a pair of anti-resonant circuits in the central collinear element of each of said arrays respectively bridging the gaps between said collinear portions, each of said anti-resonant circuits being tuned to a frequency in the range in which said collinear portions are resonant as half-wave elements.

26. An antenna comprising an upper array of three generally collinear radiating elements in longitudinally spaced relationship, said elements being resonant as half-wave elements at substantially the same selected frequency, a lower corresponding array spaced from said upper array in transversely aligned relationship therewith, a pair of parallel transverse feeding conductors connecting symmetrically spaced points adjacent the center of said upper array to corresponding points on said lower array, two pairs of closely spaced, generally transverse, phasing conductors respectively located on opposite sides of said feeding conductors, each pair of said phasing conductors connecting the adjacent ends of an adjacent pair of said radiating elements in said upper array to the corresponding ends of corresponding radiating elements in said lower array, and at least one shorting conductor associated with each pair of phasing conductors for connecting them together adjacent their mid-points and forming oppositely facing phase reversing stubs for said upper and lower arrays, the central one of said collinear elements in each of said arrays having a pair of gaps therein respectively located on opposite sides of said pair of feeding conductors for dividing said central collinear element into three longitudinally spaced, generally collinear portions, and a pair of anti-resonant circuits in the central collinear element of each of said arrays respectively bridging the gaps between said collinear portions, each of said anti-resonant circuits being tuned to a frequency in the range in which said generally collinear portions are resonant as half-wave elements.

27. An antenna comprising an upper array of three generally collinear radiating elements in longitudinally spaced relationship, said elements being resonant as half-wave elements at substantially the same selected frequency, a lower corresponding array spaced from said upper array in transversely aligned relationship therewith, a pair of parallel transverse feeding conductors connecting symmetrically spaced points adjacent the center of said upper array to corresponding points on said lower array, two pair of closely spaced generally transverse phasing conductors respectively located on opposite sides of said feeding conductors, each pair of said phasing conductors connecting the adjacent ends of an adjacent pair of said radiating elements in said upper array to the corresponding ends of corresponding radiating elements in said lower array, and a shorting conductor associated with each pair of phasing conductors for connecting them together adjacent their mid-points and forming oppositely facing phase reversing stubs for said upper and lower arrays, said shorting conductor being a common element of each oppositely facing pair of said stubs, the central one of said collinear elements in each of said arrays having a pair of gaps therein respectively located on opposite sides of said pair of feeding conductors for dividing said central collinear element into three longitudinally spaced, generally collinear portions, and a pair of anti-resonant circuits in the central collinear element of each of said arrays respectively bridging the gaps between said collinear portions, each of said anti-resonant circuits being tuned to a frequency in the range in which said collinear portions are resonant as half-wave elements.

28. A television antenna conductor adapted to serve as part of a collinear member of a collinear array of conductors, comprising a rod of conductive material formed into two axially aligned portions separated by a gap and connected across said gap by a generally U-shaped portion, the opposite extremities of said rod being formed into loops for receiving mounting elements, said loops being disposed in a plane normal to the plane defined by said U-shaped portion for receiving hinge pintles extending parallel to the plane of said U-shaped portion.

29. The device of claim 28 in which said axially aligned portions are of substantially the same length, the actual length of said rod is between 11 and 16 inches and its developed length is between 18 and 30 inches.

30. The device of claim 28 in which said aligned portions are of substantially the same length and the developed length of said U-shaped portion is from about 65% to about 100% of the sum of the lengths of said aligned portions.

*31. An antenna comprising at least three radiating conductor elements of substantially equal resonant length disposed in longitudinally spaced relationship, means connecting said conductor elements for substantially in-phase operation as a collinear array at one frequency, and means interposed in at least one of said conductor elements for connecting portions thereof for in-phase operation as a collinear array at a substantially higher frequency.*

*32. An antenna comprising a plurality of radiating conductor elements of substantially equal resonant length disposed in longitudinally spaced relationship, anti-resonant circuit means connecting said conductor elements in series as a collinear array for substantially in-phase operation as half-wave elements at a selected frequency, a transmission line connected to said array in driven relationship therewith, and a plurality of additional anti-resonant circuit means interposed in and forming a part of at least one of said conductor elements to divide it into a plurality of conductor portions, said additional anti-resonant circuits having a relatively low impedance at said selected frequency and maximum impedance at a substantially higher frequency.*

*33. An antenna comprising at least three radiating conductor elements of substantially equal resonant length disposed in longitudinally spaced relationship, circuit means connecting said conductor elements as a collinear array for substantially in-phase operation as half-wave elements at a selected frequency, a plurality of anti-resonant circuits interposed in and forming a part of at least one of said conductor elements to divide it into three conductor portions, said anti-resonant circuits having a relatively low impedance at said selected frequency and maximum impedance at a substantially higher frequency substantially corresponding to the half-way resonant frequency of at least one of said three conductor portions.*

*34. An antenna comprising at least three radiating conductor elements of substantially equal resonant length disposed in longitudinally spaced relationship, circuit means connecting said conductor elements as a collinear array for substantially in-phase operation as half-way elements at a selected frequency, a plurality of anti-resonant circuits interposed in and forming a part of at least one of said conductor elements to divide it into three conductor portions, said anti-resonant circuits having a relatively low impedance at said selected frequency and maximum impedance at a substantially higher frequency substantially corresponding to the half-way resonant frequency of the one of said conductor portions extending between said anti-resonant circuits.*

*35. An antenna comprising at least three conductor elements disposed in longitudinally spaced relationship, means connecting said elements as a collinear array for substantially in-phase operation as half-way elements at a selected frequency, a pair of transmission line feeders substantially at the center of said array, and at least one pair of anti-resonant circuits respectively interposed in conductor elements of said array on opposite sides of said pair of transmission line feeders, said anti-resonant circuits being selected to have a relatively low impedance at said selected frequency and substantially infinite impedance at a substantially higher frequency, and said anti-resonant circuits being interposed in said array at locations selected to produce substantially in-phase operation at said higher frequency of portions of said conductor elements connected to said anti-resonant circuits.*

*36. An antenna comprising at least three conductor elements disposed in longitudinally spaced relationship, means connecting said elements as a collinear array for substantially in-phase operation as half-wave elements at a selected frequency, including a pair of feeding conductors connected to said array adjacent the center thereof, and at least two anti-resonant circuits respectively interposed in said array at locations symmetrically disposed on opposite sides of said feeding conductors for producing substantially in-phase operation at a frequency substantially higher than said selected frequency of portions of said array to which said anti-resonant circuits are connected.*

*37. An antenna comprising an even plurality of at least four radiating conductors of substantially equal resonant lengths disposed in longitudinally spaced relationship, means including a pair of transmission line conductors connecting said elements of said array for substantially in-phase operation as half-wave elements at a selected frequency, and a pair of anti-resonant circuits respectively interposed in radiating conductors of said array on opposite sides of said transmission line conductors, said anti-resonant circuits having a relatively low impedance at said selected frequency and substantially infinite impedance at a substantially higher frequency and being interposed at location selected to produce substantially in-*

*phase operation at said higher frequency of a pair of radiating conductor portions respectively disposed between said anti-resonant circuits on opposite sides of said transmission line conductors.*

*38. An antenna comprising an even plurality of at least four radiating elements of substantially equal resonant lengths disposed in longitudinally spaced relationship, means including a pair of transmission line conductors connecting said elements of said array for substantially in-phase operation as half-wave elements at a selected frequency, and a pair of anti-resonant circuits respectively interposed in radiating conductors of said array on opposite sides of said transmission line conductors, said anti-resonant circuits having a relatively low impedance at said selected frequency and substantially infinite impedance at a substantially higher frequency and being interposed at locations selected to produce substantially in-phase operation at said higher frequency of four radiating conductor portions each of which is connected to one of said anti-resonant circuits.*

*39. An antenna comprising an even plurality of at least four radiating elements of substantially equal resonant lengths disposed in longitudinally spaced relationship, phasing means connecting pairs of said elements for substantially in-phase operation as half-wave elements at a selected frequency, including a pair of transmission line conductors respectively connected to adjacent ends of the centermost pair of said elements, and a pair of anti-resonant circuits respectively interposed in said centermost pair of said elements for dividing each into separated inner and outer parts, each of said anti-resonant circuits being a shorted stub having a relatively low impedance at said selected frequency and substantially infinite impedance at a substantially higher frequency in the range in which said inner and outer parts are resonant as half-wave elements for producing substantially in-phase operation at said higher frequency of said inner and outer parts.*

References Cited in the file of this patent or the original patent

UNITED STATES PATENTS

| | | |
|---|---|---|
| 1,790,646 | Alexanderson | Feb. 3, 1931 |
| 2,229,865 | Morgan | Jan. 28, 1941 |
| 2,237,779 | Carter | Apr. 8, 1941 |
| 2,282,292 | Amy et al. | May 5, 1942 |
| 2,380,333 | Scheldorf | July 10, 1945 |
| 2,535,298 | Lattin | Dec. 26, 1950 |
| 2,566,287 | Finneburgh, Jr. | Aug. 28, 1951 |